Figure 3:
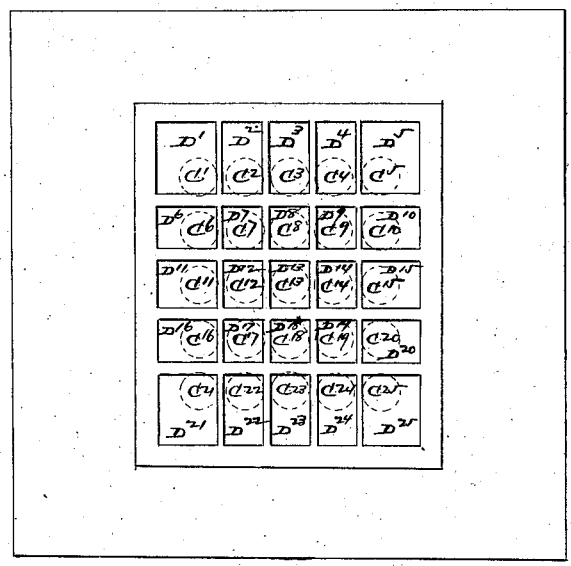

(No Model.)  H. KUHN.  4 Sheets—Sheet 1.
PHOTOGRAPHIC APPARATUS.
No. 366,225.  Patented July 12, 1887.
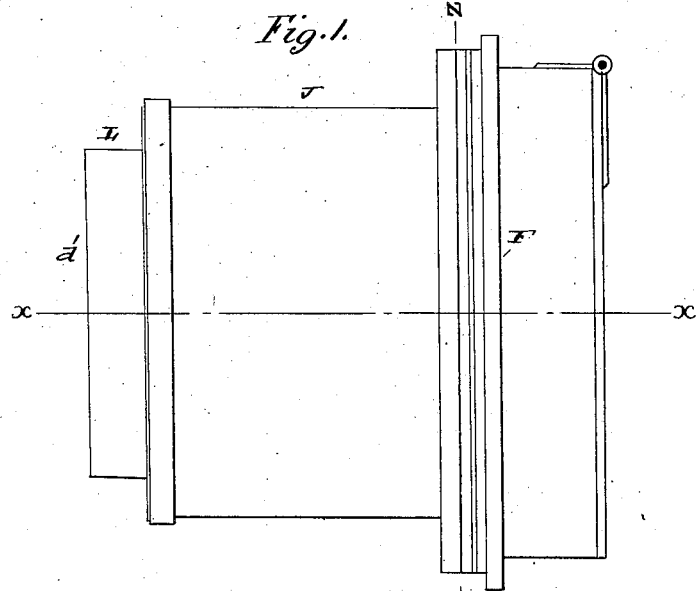
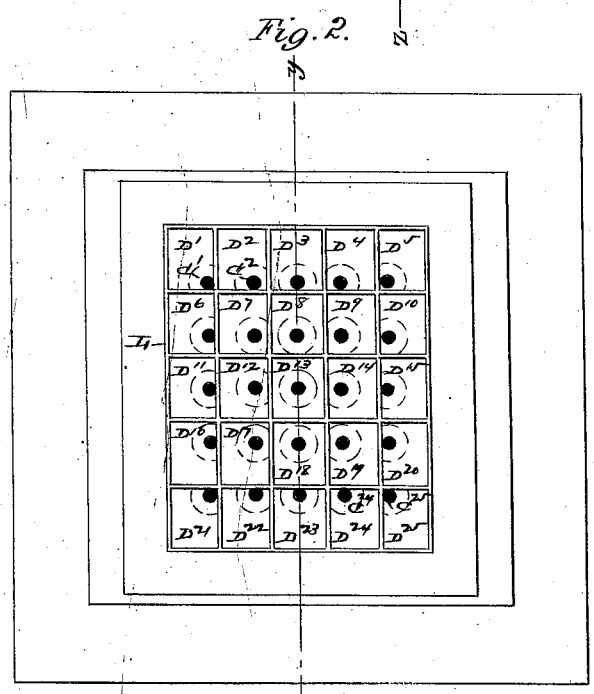
Witnesses:
J. W. Hoke.
B. Hewit.
Inventor:
Henry Kuhn
by E. D. Moody
atty (No Model.) 4 Sheets—Sheet 2.

H. KUHN.
PHOTOGRAPHIC APPARATUS.

No. 366,225. Patented July 12, 1887.

Witnesses
J. W. Hoke.
B. Hewit.

Inventor:
Henry Kuhn
by E. D. Moody
atty (No Model.) 4 Sheets—Sheet 3.
H. KUHN.
PHOTOGRAPHIC APPARATUS.
No. 366,225. Patented July 12, 1887.
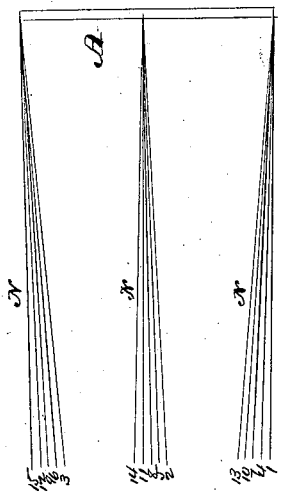
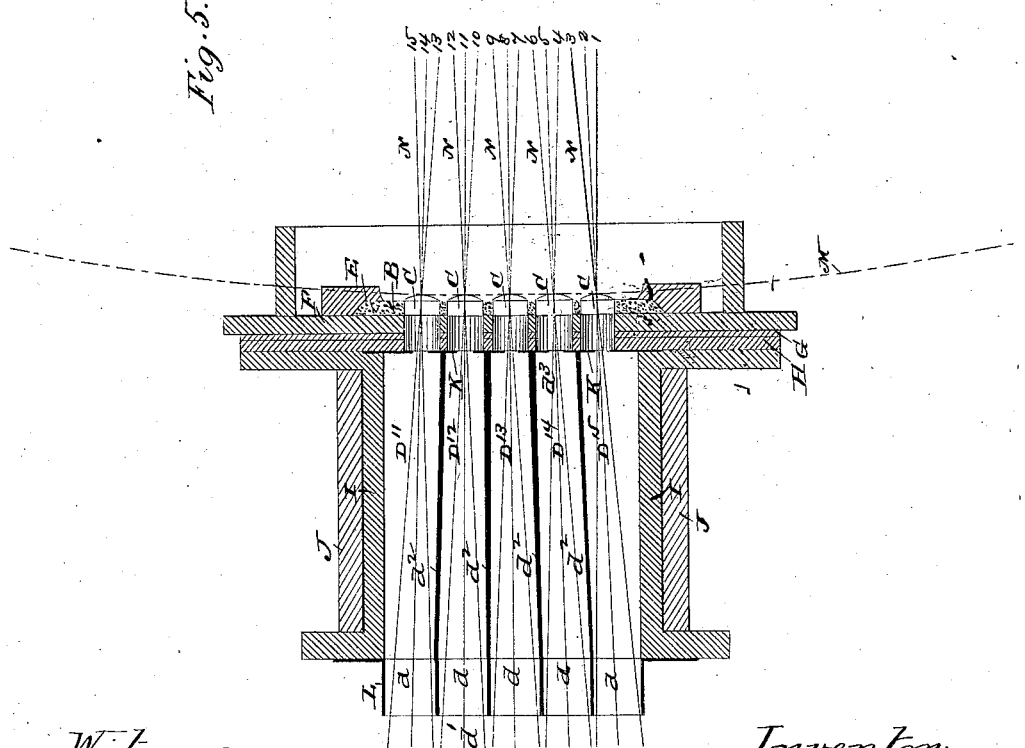
Fig. 5.
Witnesses:
J. W. Hoke.
B. Hewit.
Inventor:
Henry Kuhn
by C. D. Moody
atty (No Model.) 4 Sheets—Sheet 4.
H. KUHN.
PHOTOGRAPHIC APPARATUS.
No. 366,225. Patented July 12, 1887.
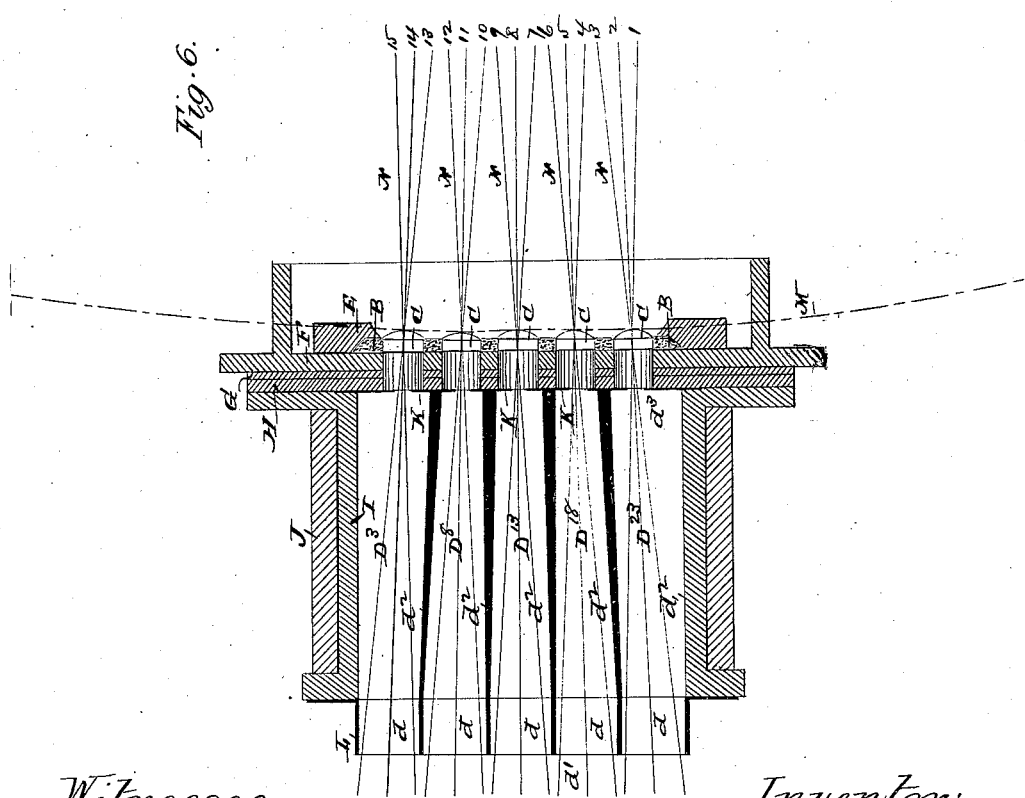
Witnesses:
J. W. Hoke.
B. Hewit.
Inventor:
Henry Kuhn
by C. D. Moody
atty

UNITED STATES PATENT OFFICE.

HENRY KUHN, OF ST. LOUIS, ASSIGNOR TO HENRY A. HYATT, OF KIRKWOOD, MISSOURI.

PHOTOGRAPHIC APPARATUS.

SPECIFICATION forming part of Letters Patent No. 366,225, dated July 12, 1887.

Application filed October 7, 1885. Serial No. 179,273. (No model.)

*To all whom it may concern:*

Be it known that I, HENRY KUHN, of St. Louis, Missouri, have made a new and useful Improvement in Photographic Apparatus, of which the following is a full, clear, and exact description.

The apparatus in question is designed for taking a sheet of multiple photographic pictures, the pictures being arranged regularly upon the sheet and alongside but distinct from each other and all taken at a single exposure. Such pictures I term "stamp-portraits," as in size and general appearance they resemble postage-stamps. To produce them economically, a large number—in practice twenty-five—must be taken at a time and upon a comparatively small plate—say, a five by seven (inches) plate—and by copying, as from a cabinet-photograph.

The improvement is carried out as follows: The distance between the picture copied and the sensitized plate upon which the multiple pictures are to be produced is fixed and afterward not changed. A lens-holder containing as many lenses as there are pictures to be taken upon the sheet is interposed between the picture to be copied and the sensitized plate. The adjustment of the lenses requires careful consideration. They must be disposed relatively to each other and to the picture to be copied and the sensitized plate, so that the pictures to be produced shall be uniformly arranged upon the sheet of equal size and equally distinct, and so that while in immediate proximity to each other they are clearly distinct from each other and capable of being separated from each other, and when separated being finished pictures substantially coextensive with the lines of separation. To this end the lenses are located and grouped as hereinafter specially designated, and from each lens a compartment extends to the sensitized plate, or, preferably, almost to the sensitized plate, as hereinafter explained. The sheet of multiple pictures being larger in area than the space occupied by the lenses, and the lenses being associated as hereinafter shown, the compartments enlarge in the direction of the sensitized plates, being at the end toward the lenses large enough and suitably shaped to receive the light from the lens, and at the opposite end coinciding in size and shape with the picture to be taken.

It is obvious that in multiple photography—*i.e.*, where a number of so-called "fac-simile photographs" are produced through a corresponding number of lenses from a single object—the pictures cannot be mathematically exact fac-similes, for the reason that the lenses cannot all occupy the same position relative to the object. Each lens has its own position with relation to the object, and each receives the rays of light therefrom on a different angle, according to its said position. The concentration of the lenses into as small a field as possible, and consequent approximation to the position of the central lens with relation to the object, offers the nearest approach to perfection in the production of fac-similes. At the same time it is impossible that the negative and sheet of photographic pictures should be of so small area as it is desirable and possible to have the field of the lenses. While concentrating the lens-field therefore for the purpose above described, I focus the lenses in a manner that may be called "radial," so that the field of their transmitted rays upon the sensitive plate may be of much greater area than said lens-field and produce a proportionately larger photographic sheet through both fields, and the face of each picture may, by the arrangement of parts hereinafter described, be of similar proportions. The light-excluding compartments will be arranged in a manner to correspond with this focusing of the lenses. Their arrangement may be described as "radial," or they may be described as "enlarging" compartments. The latter word, however, must be understood as referring to the area of the outer end of the compartment as compared with the field of the lens at its inner end and not necessarily to the arrangement of the walls of the compartment. It will be understood that it is possible to concentrate the lens field, and to so focus the lenses as to extend the area of the sensitive plate to a greater degree than in the apparatus which I have illustrated in connection with this specification.

The annexed drawings, making part of this specification, exhibit the most desirable mode of carrying out the improvement.

Figure 4:
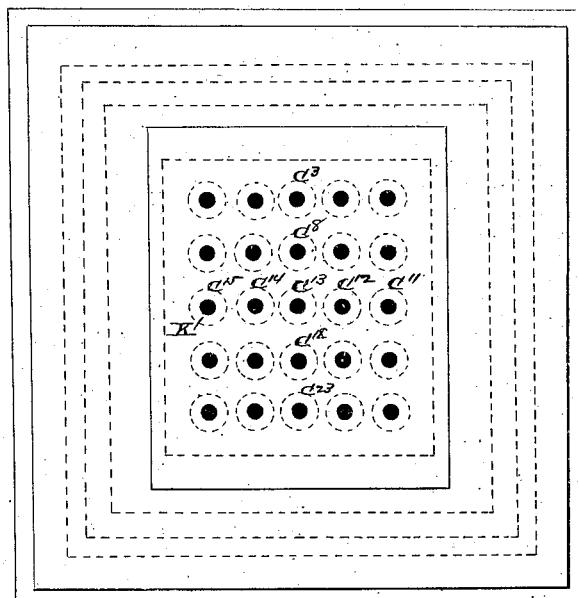

Figure 1 is a side elevation of the construction. Fig. 2 is an end elevation, being that end of the construction against which the ground glass and negative are placed. Fig. 3 is a view on the line $z\ z$ of Fig. 1, looking toward the lenses. Fig. 4 is a view on the same line $z\ z$, looking from the lenses. Fig. 5 is a horizontal section on the line $x\ x$ of Fig. 1, and Fig. 6 is a vertical section on the line $y\ y$ of Fig. 2.

The same letters of reference denote the same parts.

A, Figs. 5 6, represents the picture being copied.

B represents the lens-holder.

$C'\ C^2$, &c., represent the lenses.

$D'\ D^2$, &c., represent the compartments, respectively, belonging to the lenses.

The lenses, lens-holder, and compartments, together with whatever details necessary to properly unite them, are combined to form a single construction which can be manipulated as a single piece and either by itself or in connection with the frame of an ordinary photographic camera. As the lenses must not only be originally carefully adjusted in position, but also subsequently carefully retained in place, the lens-holder B is composed of a material—such as plaster-of-paris—which is unaffected or substantially unaffected by the moisture of the atmosphere, as otherwise a material variance in the degree of humidity of the atmosphere is liable to so disarrange the lenses as to materially interfere with their proper working. In the present instance the lens-holder, by means of a suitable frame, E, Figs. 5 6, is attached to a plate, F, and that in turn is backed with the two wooden pieces G H, the grain of the two pieces running in cross directions. The piece H is fastened to the shell I, which serves to inclose mainly the compartments $D'$, $D^2$, &c., and the shell in turn is contained in an outer frame, J. These parts, E F G H I J, as described, answer my purpose very well, but not all of them are necessary, and I desire not to be confined specially thereto, as this portion of the structure may be variously fashioned and made, so long as the lenses are properly held and the compartments properly shaped and extended.

The placing of the lenses and the forming of the compartments will now be described more particularly. The size and proportions of the sheet of multiple pictures are determined, as also that of one of the multiple pictures. This can be understood by referring to Figs. 5, 6, and more especially to Fig. 2, as the sheet coincides with the combined openings $d$ at the end $d'$ of the compartments $D'\ D^2$, &c., and the multiple pictures respectively coincide with the openings $d$. The size of the picture A copied is taken into consideration, as well as its distance from the lenses. It must be spaced sufficiently from the lenses to enable all of them to "catch" the picture; and, on the other hand, the lenses must respectively focus at the end $d$ of the compartments $D'$, $D^2$, &c. In practice the picture A is usually arranged forty inches from the lenses, and the compartments $D'$, $D^2$, &c., are usually six inches in length when stamp portraits or pictures are to be taken from cabinet-sized photographs. The picture copied is placed closer, and the compartments are enlarged at the outer end when larger-sized pictures are to be taken. As the multiple pictures are directly alongside each other, the lenses must be grouped closely, so closely in fact that they have to be reduced, in practice, to a diameter not exceeding one-half of an inch when the smallest-size pictures are to be taken. As the stamp portraits or multiple pictures are in the present instance longer vertically than transversely, the lenses, as seen in Fig. 3, are somewhat farther apart vertically than transversely and in accordance with the proportions of the picture; but whether spaced apart more in one direction than in the other, the lenses are so near to each other as to cause the partitions $d^2$, which form the compartments $D'$, $D^2$, &c., to be nearer together at the end $d^3$ of the compartments than at the end $d'$. The compartments $D'$, $D^2$, &c., therefore enlarge from the end $d^3$ to the end $d'$, substantially as is represented, but with this exception, it being more convenient to make the structure square or squarish externally, it (meaning the combined compartments $D'$, $D^2$, &c.) is of the same dimensions externally at one end as at the other, and hence those of the compartments $D'$, $D^2$, &c., which are next to the shell I are carried out square at the end $d^3$. They could be made to taper like the interior compartments, which necessarily taper, as described. The compartments, in effect, begin at the diaphragm K, which is located against the piece H and used for the same purpose the ordinary diaphragm is used for. The compartments, in the present instance, extend beyond the shell I, the extension L, in practice, being of metal, preferably copper, as thereby the extreme end of the partitions $d^2$ can be brought down thin and true to good advantage. The partitions of the extension L are preferably parallel, as thereby a better effect is produced. In practice lenses, even of the same kind, vary slightly as to focus; hence in making appliances of the kind under consideration it becomes necessary often in finally adjusting the lenses to make allowance for the slight variance alluded to by testing each lense *in situ* and placing it accordingly, and so that it shall focus evenly with the others.

The invention is best carried out by arranging the lenses in an arc, M, Figs. 5, 6, of a circle whose center is at the point occupied by the picture A. The lines N, Figs. 5, 6, are drawn for the purpose of indicating the location of the various lenses with reference to the pictures to be copied and the pictures to be taken. The lines are broken, from lack of room upon the sheet. The numbers 1, 2, 3, &c., however, indicate the connection, the line numbered 1 at the left connecting with the line numbered 1 at the right, and so on. Where the lines 1 and 3 cross, is the position of the lower lens, as shown in Fig. 5; where the lines 4 and 6 cross, the position of the next lens, and so on. The position of the lenses in the other direction is similarly indicated in Fig. 6. With all the parts thus adjusted, and the picture A always held in the same place, the sheets of multiple pictures can be rapidly made, it only being necessary to drop the picture A into its rest and then expose the sensitized plate as rapidly as the pictures can be taken. In practice the sensitized plate is not placed directly against the end of the extension L, but a slight distance—say three thirty-seconds of an inch—therefrom. This enables the light to shine from the ends of abutting apartments crosswise past the edge of the partition, and by using a mat upon the picture A, with a white margin, the lines of separation between the multiple pictures will show white, and thereby the pictures can be made more distinct upon the sheet and more readily separated. The rest for the picture A, and also for the apparatus, is not shown. The lenses used are achromatic, are convex on the side toward the picture copied, and slightly concave on the opposite side.

I claim—

1. The herein-described photographic apparatus, consisting of the lenses and the light-excluding compartments, the lenses being closely grouped and focused on substantially radial lines, as described, and said compartments being correspondingly arranged, as set forth.

2. The herein described photographic apparatus, the same consisting of the lenses grouped and radially focused closely together, and the enlarging radially-arranged compartments immediately contiguous with each other and equal in number to said lenses, substantially as described.

3. In combination with a picture-rest at a fixed distance therefrom, the herein-described photographic apparatus, the same consisting of the lenses grouped and radially focused, as described, and the enlarging radially-arranged compartments immediately contiguous with each other and equal in number to said lenses, substantially as set forth.

4. A photographic apparatus having the group of radially-focused lenses, and the radially-arranged compartments, immediately contiguous with each other and equal in number to said lenses, leading from the lens-holder, or a backing against the lens-holder, continuously through to or nearly to the point which the sensitized plate is used, substantially as described.

5. In a photographic apparatus, the combination of the lenses $C'$ $C^2$, the lens-holder, and the series of immediately contiguous compartments $D'$ $D^2$, adapted to produce a photographic sheet in which the fac-similes are alongside each other, the lenses and compartments being equal in number, the former being radially focused and the latter radially arranged as described, and each of the compartments being provided with one of said lenses, substantially as set forth.

6. A photographic apparatus having the lenses $C'$ $C^2$, the lens-holder B, and the compartments $D'$ $D^2$, said lenses being spaced in one direction farther apart than in the cross-direction, and said compartments enlarging in the direction of the point where the sensitized plate is used, and at the end $d'$ being extended in one direction more than the cross-direction, as described.

7. The combination, with the lenses, the lens-frame F, the shell I, containing the light-excluding compartments arranged to correspond with the focusing of the lenses, and the veneers G H, arranged with their grains crosswise and secured to the inner of said compartment-shell, substantially as described.

Witness my hand.

HENRY KUHN.

Witnesses:
C. D. MOODY,
I. W. U. SANFORD.